(12) United States Patent
Itagaki et al.

(10) Patent No.: US 7,199,989 B2
(45) Date of Patent: Apr. 3, 2007

(54) DIGITAL PROTECTION RELAY WITH TIME SYNC FUNCTION

(75) Inventors: Daiju Itagaki, Akiruno (JP); Hiroaki Ayakawa, Tama (JP); Itsuo Shuto, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 490 days.

(21) Appl. No.: 10/669,704

(22) Filed: Sep. 25, 2003

(65) Prior Publication Data

US 2004/0070909 A1 Apr. 15, 2004

(30) Foreign Application Priority Data

Sep. 27, 2002 (JP) ............................. 2002-284318

(51) Int. Cl.
*H02H 3/00* (2006.01)
(52) U.S. Cl. ........................ 361/78; 361/80; 361/89; 342/357.06; 375/354; 375/366; 375/368; 375/370; 702/59
(58) Field of Classification Search .............. 361/80, 361/78, 89; 324/418; 702/59; 342/357.06; 375/354, 366, 368, 370
See application file for complete search history.

(56) References Cited

U.S. PATENT DOCUMENTS

| | | | | |
|---|---|---|---|---|
| 4,709,295 A | * | 11/1987 | Yamaura et al. | 361/80 |
| 5,293,295 A | * | 3/1994 | Nishitani | 361/63 |
| 5,786,699 A | * | 7/1998 | Sukegawa et al. | 324/617 |
| 6,597,180 B1 | * | 7/2003 | Takaoka et al. | 324/512 |
| 6,618,648 B1 | | 9/2003 | Shirota et al. | |
| 6,714,148 B1 | | 3/2004 | Saga et al. | |
| 6,847,691 B2 | | 1/2005 | Torikoshi et al. | |
| 2002/0051271 A1 | * | 5/2002 | Yoshikoshi | 359/189 |

FOREIGN PATENT DOCUMENTS

| | | |
|---|---|---|
| DE | 100 36 698 A1 | 3/2001 |
| JP | 63-302633 A | 12/1988 |
| JP | 11-191919 A | 7/1999 |
| JP | 11-341706 A | 12/1999 |
| JP | 2001-045646 A | 2/2001 |
| JP | 2001-109781 A | 4/2001 |
| JP | 2001-158936 A | 6/2001 |
| JP | 2001-221874 A | 8/2001 |
| JP | 2002-118952 A | 4/2002 |

OTHER PUBLICATIONS

Gao Houlei et al., "Development of GPS Synchronized Digital Current Differential Protection", Power System Technology, IEEE 1998, XP010312803, pp. 1177-1182.

* cited by examiner

*Primary Examiner*—Stephen W. Jackson
*Assistant Examiner*—Terrence Willoughby
(74) *Attorney, Agent, or Firm*—Foley & Lardner LLP

(57) ABSTRACT

In a digital protection relay with a time sync function, the sampling timing of which is specified based on a reference timing transmitted from a time signal generator to a time sync unit, with a determination value. The time sync unit includes a reception circuit that receives a discrimination code and time data transmitted from the time signal generator, a code discrimination circuit that discriminates the reference timing on condition that the received discrimination code coincides with a desired code, a time calculation circuit that calculates the sampling timing on the basis of the discriminated reference timing and the time data, and a sampling sync circuit that specifies the sampling timing of a digital quantity of electricity on the basis of the calculated sampling timing.

10 Claims, 11 Drawing Sheets

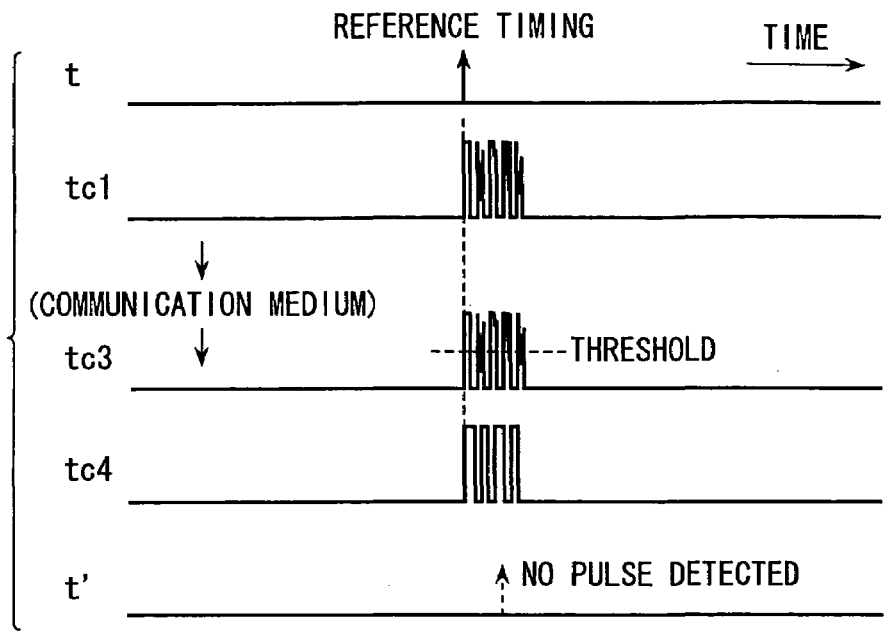
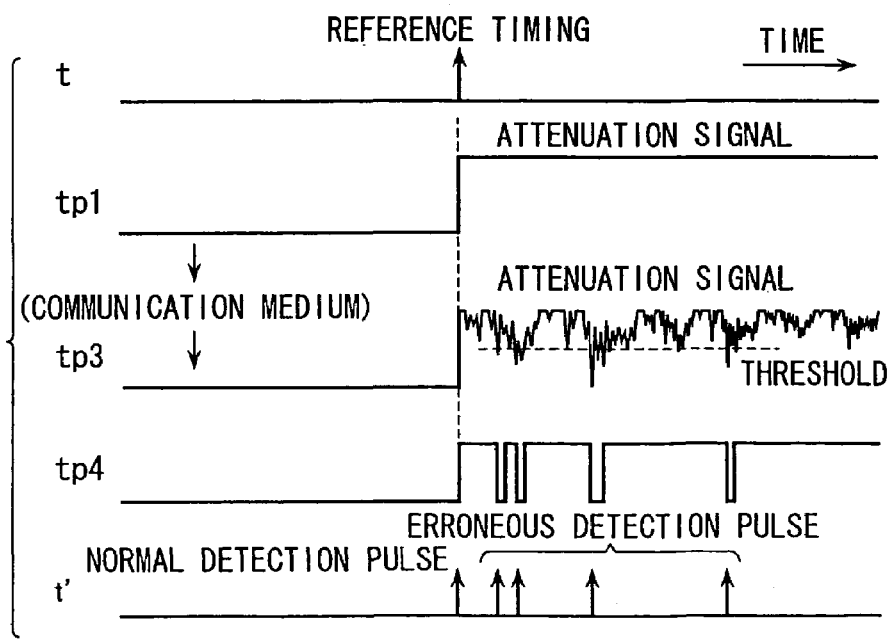

DIGITAL PROTECTION RELAY WITH TIME SYNC FUNCTION

BACKGROUND OF THE INVENTION

1. Field of the Invention

The present invention relates to a digital protection relay including a time sync function.

2. Description of the Related Art

FIG. 1 shows a circuit configuration of a conventional digital protection relay.

In FIG. 1, a digital protection relay RY includes an analog input unit 1 that samples an quantity of electricity 1a input from a power system PS at predetermined cycles and converts the analog amount to a digital amount; time sync means 2 that receives a digital quantity of electricity 1b obtained by the analog input unit 1; and a determination unit 3 that compares a digital quantity of electricity 2m output from the time sync means 2 with a determination value and discriminates the presence/absence of a fault in the power system.

The time sync means 2 includes a reception circuit 21 that receives a reception pulse signal tp3 indicative of a reference timing and time data sd3, which are sent from a reference time signal generator 4 (to be described later in detail) via a communication medium L; a pulse detection circuit 22 that generates a reference timing t' by detecting a digital pulse signal tp4 output from the reception circuit 21; a time calculation unit 23 that calculates a sampling timing 2h on the basis of a time data signal sd4 output from the reception circuit 21 and the reference timing t' output from the pulse detection circuit 22; and a sampling sync circuit 24 that specifies the sampling timing of the digital quantity of electricity input from the analog input unit 1, on the basis of the sampling timing 2h calculated by the time calculation unit 23.

On the other hand, the reference time signal generator 4 includes a reference timing generating circuit 41 that receives a reception signal 5a received from a positioning system 5 and generates a reference timing t in units of a second; a pulse generating circuit 42 that converts the reference timing t generated by the reference timing generating circuit 41 to a reference timing pulse signal tp1; a time generating circuit 43 that generates time data sd1, such as year/month/day/hour/minute/second, on the basis of the reception signal 5a received from the positioning system 5; and a transmission circuit 44 that transmits to the protection relay RY via the communication medium L the time data sd1 generated by the time generating circuit 43 and the timing pulse signal tp1 generated by the pulse generating circuit 42.

As has been described above, in the conventional digital protection relay, when the reference timing obtained from the reception signal delivered from the positioning system 5 is to be sent to the time sync means 2 in the protection relay, the reference timing is converted to a pulse signal varying in magnitude at the time point of the reference timing and this pulse signal is transmitted, as shown in FIG. 2 by way of example.

However, if the pulse signal input to the reception circuit 21 deteriorates due to noise occurring in the course of communication or degradation in the communication medium L such as transmission/reception elements or cables, the magnitude of the signal varies over the determination threshold value at a timing differing by ΔT from the reference timing, as shown in FIG. 2, and the reference timing may erroneously be recognized.

As a result, the sampling timing of the quantity of electricity data becomes erroneous. In particular, in the case where the presence/absence of a fault in the power system is determined by comparison with quantity of electricity data sampled at different locations in the power system at the same time, a fault, which has not occurred in fact, may be erroneously recognized, or a fault, which has actually occurred, may not be recognized.

BRIEF SUMMARY OF THE INVENTION

The present invention aims at solving the above problem, and the object of this invention is to provide a digital protection relay with a time sync function, which can exactly transmit, when a reference timing is to be transmitted from a time signal generator to time sync means within the protection relay, the reference timing even if noise occurs or the signal quality deteriorates, and which can also eliminate an error in sampling timing of quantity of electricity data and correctly recognize the presence/absence of occurrence of a fault in a power system.

According to an aspect of the present invention, there is provided a digital protection relay with a time sync function, comprising: analog input means for sampling an analog quantity of electricity input from a power system at predetermined cycles, and converting the analog quantity of electricity to a digital quantity of electricity; time sync means for receiving via a communication medium a discrimination code of a predetermined format that is generated on the basis of a reference timing generated based on a reception signal from a positioning system, and specifying a sampling timing of the digital quantity of electricity on the basis of the received discrimination code; and determination means for comparing the quantity of electricity, the sampling timing of which is specified, with a determination value, thereby discriminating the presence/absence of occurrence of a fault in the power system.

According to another aspect of the invention, there is provided a method of determining a fault in a digital protection relay with a time sync function, the method comprising: sampling an analog quantity of electricity input from a power system at predetermined cycles, and converting the analog quantity of electricity to a digital quantity of electricity; receiving via a communication medium a discrimination code of a predetermined format that is generated on the basis of a reference timing generated based on a reception signal from a positioning system, and specifying a sampling timing of the digital quantity of electricity on the basis of the received discrimination code; and comparing the quantity of electricity, the sampling timing of which is specified, with a determination value, thereby discriminating the presence/absence of occurrence of a fault in the power system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a time chart showing output states of respective parts in a case where a time signal deteriorates due to attenuation in the embodiment;

FIG. 9 is a time chart showing output states of respective parts in a case where a time signal in time sync means deteriorates due to attenuation in the conventional digital protection relay with a time sync function;

DETAILED DESCRIPTION OF THE INVENTION

Embodiments of the present invention will now be described with reference to the accompanying drawings.

Figure 1:
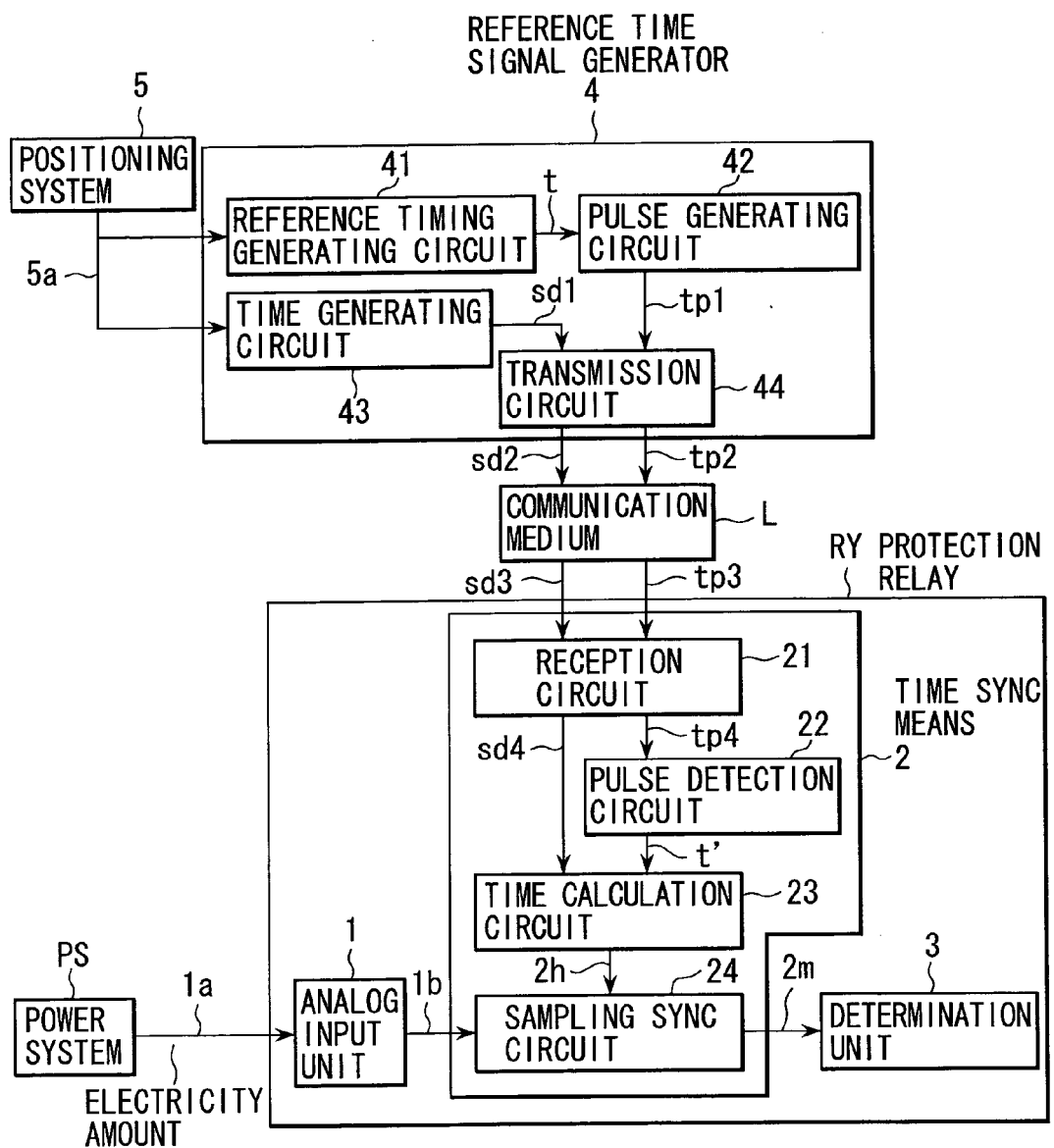
FIG. 1 is a block circuit diagram showing an example of a conventional digital protection relay with a time sync function.
Figure 2:
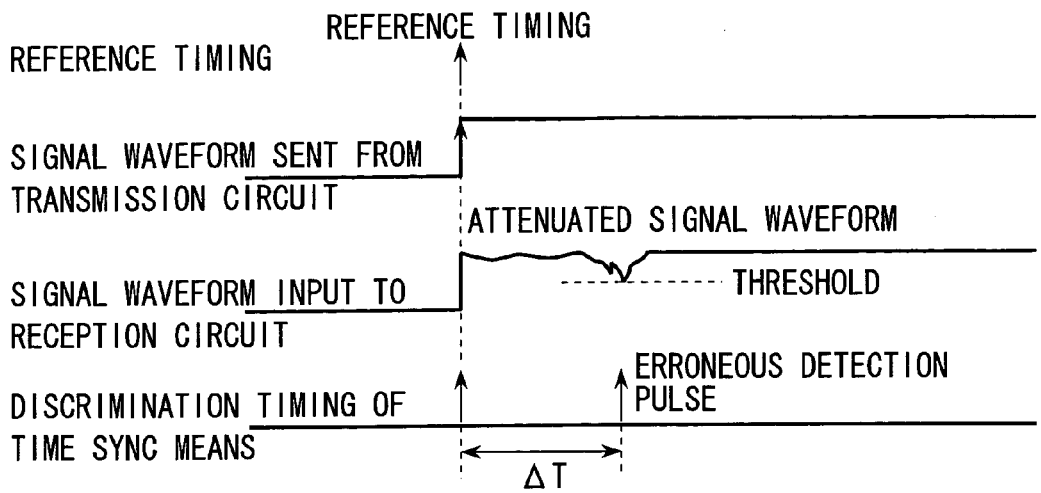
FIG. 2 is a time chart showing output states of respective parts in a case where a time signal deteriorates in the digital protection relay with the time sync function.
Figure 3:
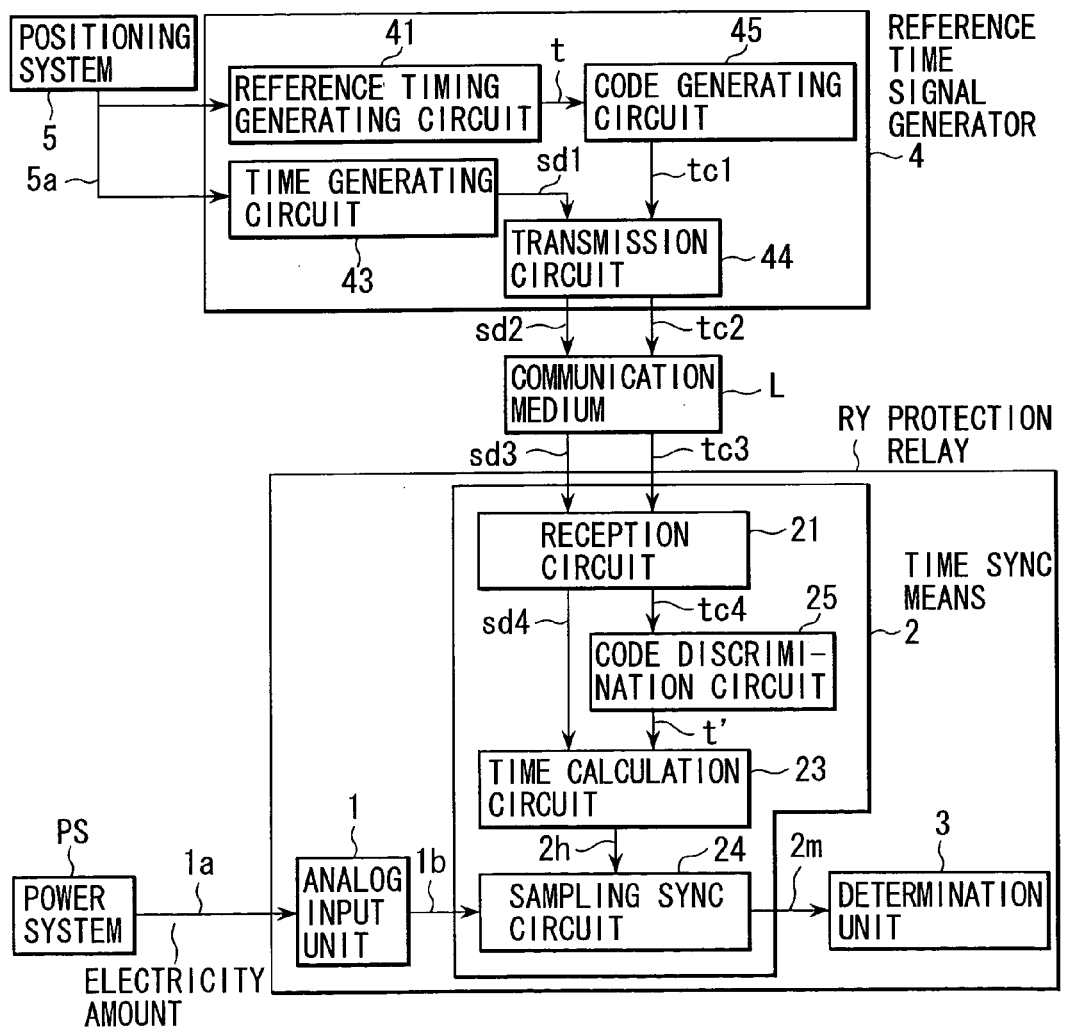
FIG. 3 is a block circuit diagram showing a first embodiment of a digital protection relay with a time sync function according to the present invention.

FIG. 3 is a block circuit diagram showing a first embodiment of a digital protection relay with a time sync function according to the present invention. The parts common to those in FIG. 1 are denoted by like reference numerals.

In FIG. 3, symbol RY denotes a digital protection relay. The digital protection relay RY includes an analog input unit 1 that samples an quantity of electricity 1$a$ input from a power system PS at predetermined cycles and converts the analog amount to a digital amount; time sync means 2 that receives a digital quantity of electricity 1$b$ obtained by the analog input unit 1; and a determination unit 3 that compares a digital quantity of electricity 2$m$ output from the time sync means 2 with a determination value and discriminates the presence/absence of a fault in the power system.

The time sync means 2 includes a reception circuit 21 that receives a discrimination code tc3 and time data sd3 from a reference time signal generator 4 (to be described later in detail) via a communication medium L; a code discrimination circuit 25 that generates a reference timing t' on condition that a digital code tc4 output from the reception circuit 21 coincides with a desired code which is a discrimination code tc1 (to be described later); a time calculation unit 23 that calculates a sampling timing 2$h$ on the basis of a time data signal sd4 output from the reception circuit 21 and the reference timing t' output from the code discrimination circuit 25; and a sampling sync circuit 24 that specifies the sampling timing of the digital quantity of electricity input from the analog input unit 1, on the basis of the sampling timing 2$h$ calculated by the time calculation unit 23.

On the other hand, the reference time signal generator 4 includes a reference timing generating circuit 41 that receives a reception signal 5$a$ received from a positioning system 5 and generates a reference timing t in units of a second; a code generating circuit 45 that generates a discrimination code tc1 of a predetermined format at the same time as the generation of the reference timing t generated by the reference timing generating circuit 41; a time generating circuit 43 that generates time data sd1, such as year/month/day/hour/minute/second, on the basis of the reception signal 5$a$ received from the positioning system 5; and a transmission circuit 44 that transmits to the protection relay RY via the communication medium L the time data sd1 generated by the time generating circuit 43 and the discrimination code tc1 generated by the code generating circuit 45 as time data sd2 and a discrimination code tc2.

Various types of media, such as an electric cable, an optical fiber or radio waves, may be usable as the communication medium L.

Various types of systems, for example, a satellite positioning system such as a GPS (Global Positioning System) or a GLONASS (Global Navigation Satellite System), and a standard frequency and time signal emissions, may be usable as the positioning system.

The operation of the digital protection relay with a time sync function having the above-described structure will now be described.

To begin with, the code tc1 generated by the code generating circuit 45 of the time signal generator 4 is explained.

Figure 4:
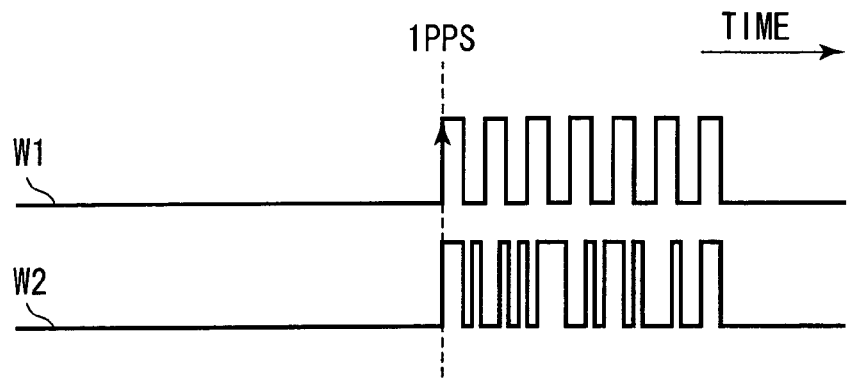
FIG. 4 is a waveform diagram showing an example of codes generated from a code generating circuit in the embodiment.

A code tc1 may take a variety of waveforms. FIG. 4 shows examples of the waveform of the code c.

In FIG. 4, as regards waveforms W1 and W2, the vertical axis indicates the magnitude of the waveform, which corresponds to, for instance, the magnitude of voltage, the intensity of light, etc. The horizontal axis indicates the time.

In FIG. 4, a broken line at the central part indicates an exact reference timing point discriminated based on the reception signal from the positioning system 5.

The waveform W1 is obtained by repeatedly altering a waveform between a maximum value and a minimum value at predetermined cycles at the same timing as the reference timing.

The waveform W2 is obtained by making the repeat cycle of the waveform W1 as irregular as possible so that the waveform includes code components in a wide range of frequencies.

In the case of the waveform W2, for example, although when noise of a fixed frequency is input to the code discrimination circuit 25, a waveform that repeatedly varies at regular cycles occurs in the input side of the code discrimination circuit 25, it is possible to prevent erroneous recognition of the discrimination code.

In addition, even if the code deteriorates due to noise, the discrimination of the reference timing can be continued by increasing the length of the code of this format and providing the code with redundancy.

Figure 5:
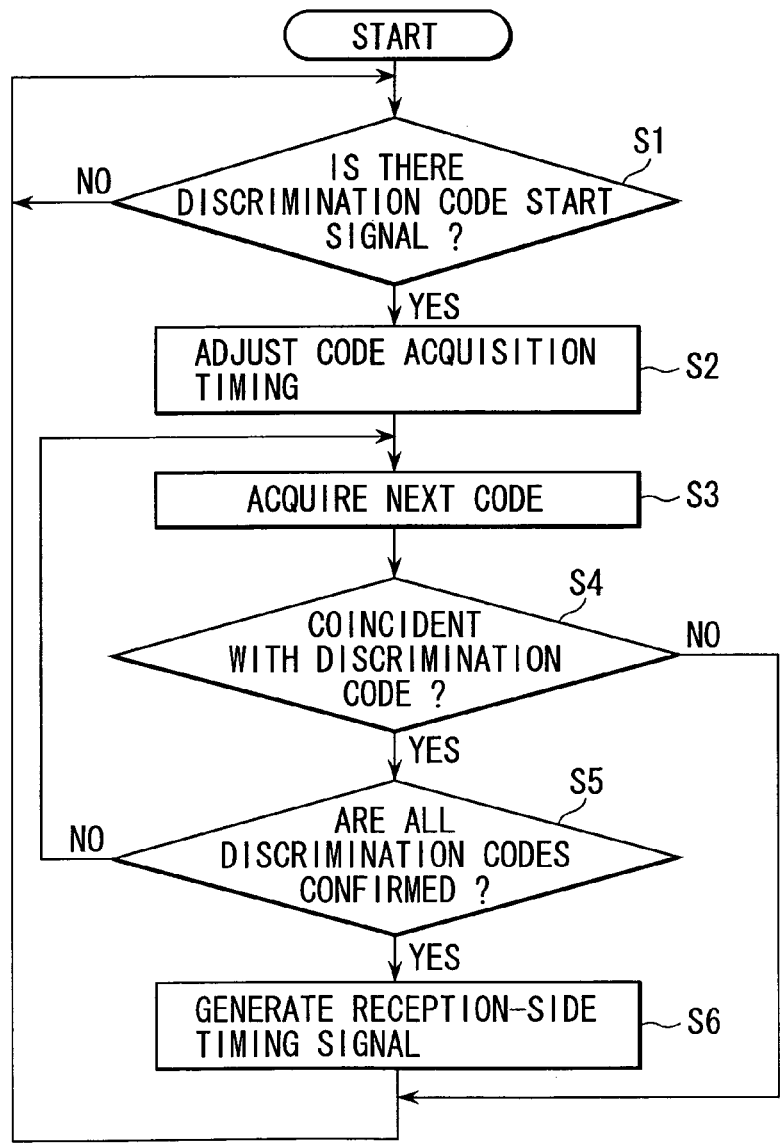
FIG. 5 is a flow chart illustrating an operation of the code generating circuit in the embodiment.

An example of the operation of the code discrimination circuit 25 in the time sync means 2 is described referring to a flow chart of FIG. 5.

In step S1, the presence/absence of a start signal of the discrimination code (which means rising edge of signal at reference timing in FIG. 4) is confirmed with respect to the signal received by the reception circuit 21. If the presence of the start signal is confirmed, the control advances to processing in step S2. If the start signal is absent, the processing in step S1 is continued.

In step S2, timing adjustment is effected so that the subsequent acquisition of the discrimination code may be performed at a predetermined timing, with the start signal being used as the start point. Then, the control goes to step S3. The predetermined timing means, for example, timing in which codes between the changing points of discrimination codes is stable.

In step S3, the acquisition of the discrimination data of the next bit discrimination code is performed. In step S4, it is determined whether the predetermined data coincides with the discrimination data of acquired discrimination code. If they coincide, the control advances to processing in step 5. If not, the control does not proceed to the next process and returns to step S1.

In step S5, it is determined whether confirmation of all bits of the discrimination data of the discrimination code is completed. If the confirmation is not completed, the control goes to processing in step S3 to confirm the discrimination data of the next bit discrimination code. If the confirmation is completed, the control goes to processing in step S6 to generate a reference timing signal. Then, the control returns to step S1, and a series of operations is completed.

If the time of generation of the code is long, a delay occurs in the time for recognizing the reference timing on the receiving side. In this case, if such a delay is constant, it can be corrected and no problem would arise.

Next, a description is given of the case where the signal sent from the transmission circuit 44 of time signal generator 4 varies due to noise in the course of communication in the present embodiment.

Figure 6:
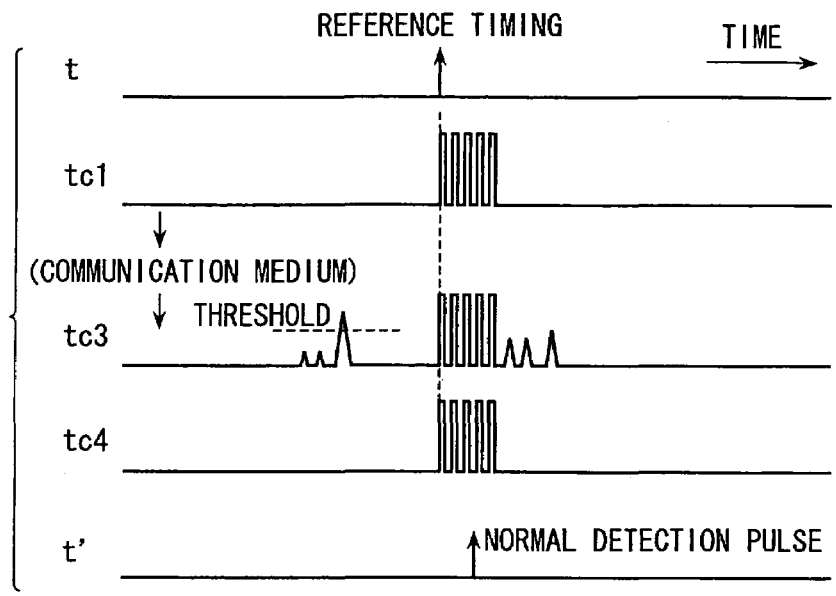
FIG. 6 is a time chart showing output states of respective parts in a case where a time signal deteriorates due to noise in the embodiment.
Figure 7:
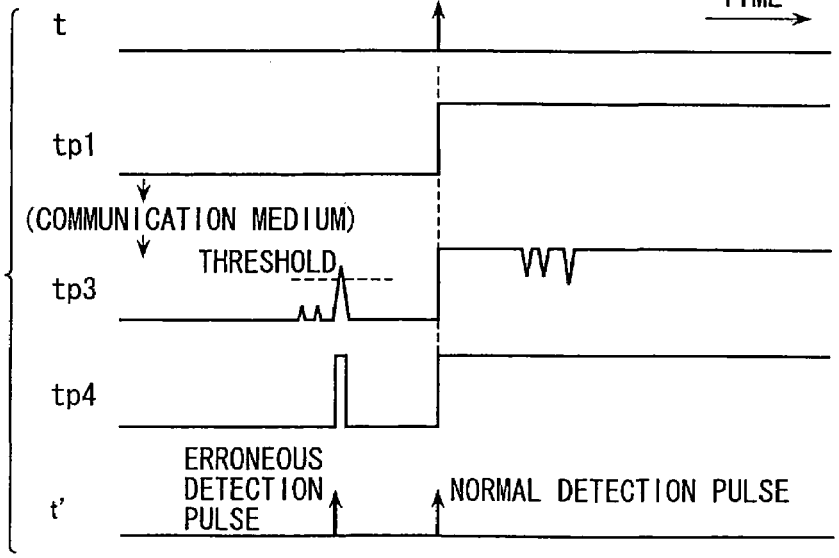
FIG. 7 is a time chart showing output states of respective parts in a case where a time signal in time sync means deteriorates due to noise in the conventional digital protection relay with a time sync function.

FIG. 6 is a time chart showing output states of respective parts in a case where a time signal deteriorates due to noise in the embodiment. FIG. 7 is a time chart showing output states of respective parts in a case where a time signal in the conventional time sync means deteriorates due to noise.

In the conventional time sync means, as shown in FIG. 7, when the reception pulse signal tp3 received by the reception circuit has varied over a threshold level (indicated by a broken line) due to noise, the digital pulse signal tp4 of the reception circuit temporarily varies and an erroneous detection pulse is generated at reference timing t' by the operation of the pulse detection circuit.

On the other hand, in the present embodiment, as shown in FIG. 6, when the discrimination code tc3 has varied over a threshold level (indicated by a broken line) due to noise, the digital code tc4 of the reception circuit 21 of the time sync means 2 temporarily varies. However, since the reception signal does not coincide with the discrimination code tc1, no erroneous detection pulse is generated by the operation of the code discrimination circuit 25 at the received reference timing t'. The data of the discrimination code tc1 transmitted from the transmission circuit 44 is pre-set in the code discrimination circuit 25. The determination for coinciding whether the data with the pre-set data or not is performed as described above.

Next, a description is given of the case where the magnitude of the signal transmitted from the transmission circuit 44 of the time signal generator 4 has attenuated in the course of communication.

FIG. 8 shows waveforms in respective parts at the point of reference timing and at times before and after the reference timing in the case where improvement is made with the use of the code discrimination signal. FIG. 9 is a waveform diagram for explaining the operation in the case where the time signal in the conventional time sync means 2 deteriorates due to attenuation.

In the conventional sync means, as shown in FIG. 9, when the reception pulse signal tp3 has attenuated below the threshold level (indicated by a broken line) due to noise because of signal attenuation in the course of communication, the digital pulse signal tp4 of the reception circuit temporarily varies and erroneous detection pulses are generated at the reference timing t' by the operation of the pulse detection circuit.

By contrast, in the case of the present embodiment, no signal exists before and after the generation timing of the discrimination code tc3. The discrimination circuit discriminates the reference timing where the all reception signals coincide with the discrimination code tc3 during the generation period of the discrimination code. Therefore, the determination circuit does not generate the detection pulse at erroneous timing even if the signal attenuates during communication.

In this case, it is possible that the discrimination code itself attenuates and becomes undetectable, so that the correct reference timing cannot be detected. However, since the time can be estimated using the reference timing at the time of normal reception, no problem would arise.

According to the present embodiment, there may be a case where in the communication process of the time signal from the time signal generator 4 to the time sync means 2 of the protection relay RY, signal deterioration occurs and a signal variation occurs at a timing different from the normal reference timing. Even in this case, since the discrimination code that is encoded by the code generating circuit 45 is not generated, the code discrimination circuit does not discriminate the reference timing. Therefore, the sampling timing does not become erroneous, and the presence/absence of a fault in the power system can correctly be recognized.

Figure 10:
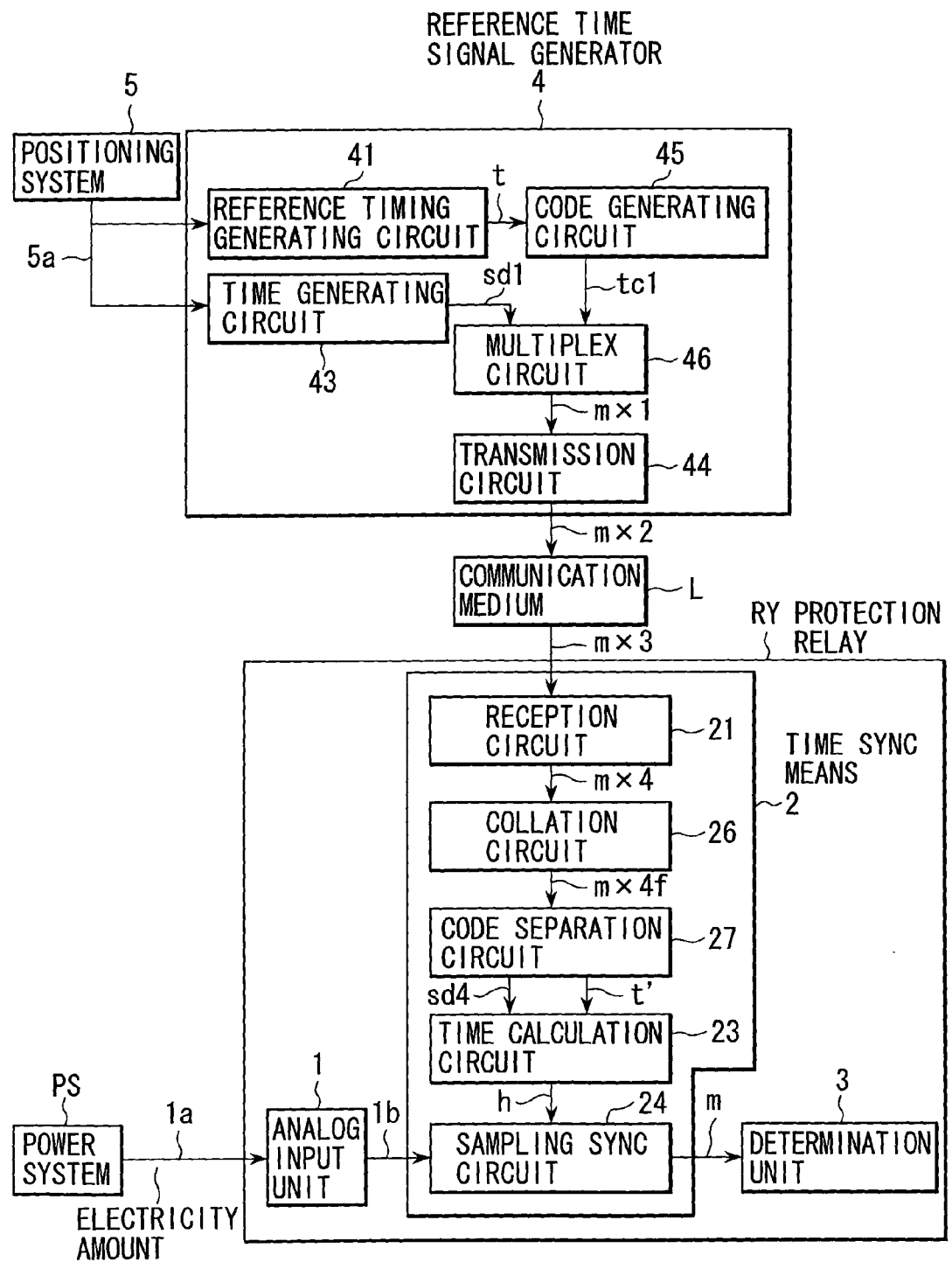
FIG. 10 is a block circuit diagram showing a second embodiment of a digital protection relay with a time sync function according to the present invention.

FIG. 10 is a block circuit diagram showing a second embodiment of the digital protection relay with a time sync function according to the present invention. The parts common to those in FIG. 3 are denoted by like reference numerals, and a description thereof is omitted. Only different parts are described.

The structure of the second embodiment differs from the structure shown in FIG. 3 in the following respects. A time signal generator TS is provided with a superimposed circuit 46 that superimposes the discrimination code tc1 output from the code generating circuit 45 with the time data sd1 output from the time generating circuit 43. In addition, in the time sync means 2 of the protection relay RY, the code discrimination circuit in FIG. 3 is replaced with a collation circuit 26 that receives a reception signal mx4, which is the superimposed signal from the reception circuit 2, and a code separation circuit 27 that receives an output signal mx4$f$ of the collation circuit 26.

The superimposed circuit 46 superimposes the discrimination code tc1 and time data sd1 into a superimposed signal mx1. The transmission circuit 44 sends out the superimposed signal mx1 as a transmission signal mx2.

On the other hand, in the protection relay RY, the reception circuit 21 receives a transmission signal mx3, which is the superimposed signal transmitted via the communication medium L. The reception circuit 21 outputs the digital superimposed signal mx4.

The collation circuit 26 subjects the value of the digital superimposed signal mx4 to a predetermined number of times of collation processes at cycles (collation cycles) shorter than the shortest pulse cycle of the discrimination code (i.e. a shortest time period in which the code does not change and continuously takes the same value).

The collation circuit 26 confirms whether the collation condition is satisfied or not. On condition that the collation condition is satisfied continuously by a predetermined number of times of collations, the collation circuit 26 varies the collation output mx4$f$ under a predetermined condition and delivers it to the code separation circuit 27.

An example of the collation process in the collation circuit 26 will now be described referring to FIGS. 11A to 11C.

Figure 11A:
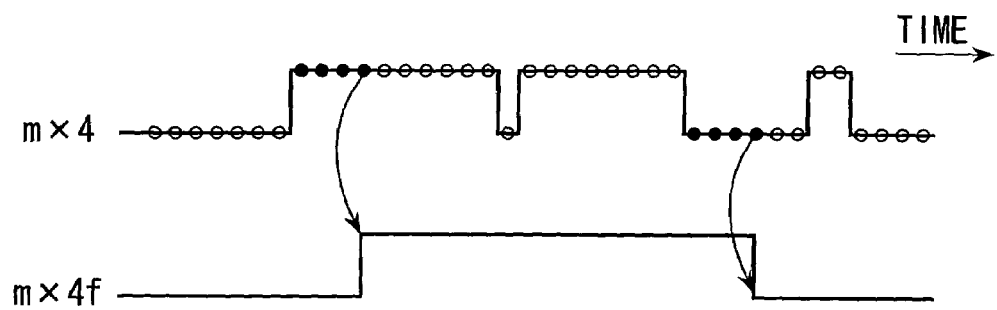
FIGS. 11A to 11C are time charts showing examples of a collation process of a collation circuit in the second embodiment.
Figure 11B:
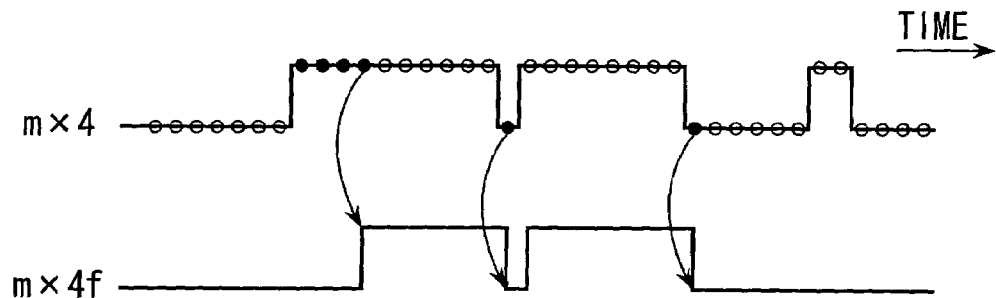
Figure 11C:
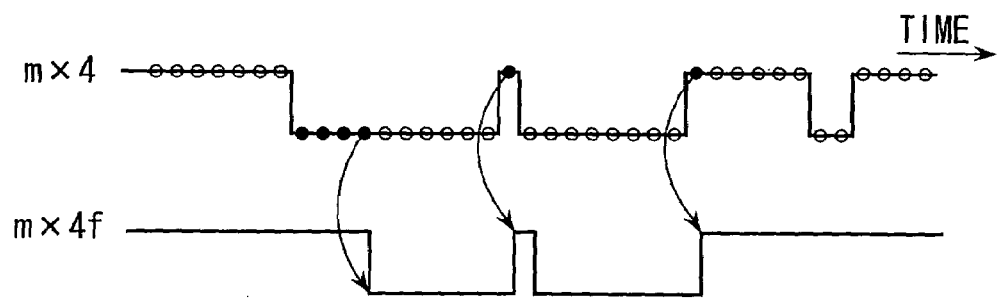

In waveform diagrams shown in FIGS. 11A to 11C, the horizontal axis indicates the time, and the vertical axis indicates logic values of the superimposed signal mx4. The upper side represents logic "1", and the lower side represents logic "0".

In FIG. 11A, it is determined whether the following condition is satisfied: the value of superimposed signal mx4 takes logic "0" or logic "1" by a predetermined number of times of collation in succession. If this condition is satisfied, the collation output mx4$f$ is changed to the corresponding logic value, and the resultant value is output.

FIG. 11A shows an example wherein the number of times of collation is four. Alternatively, the number of times of collation may be set at another value.

In FIG. 11B, it is determined whether the following condition is satisfied: the value of superimposed signal mx4 takes logic "1" by a predetermined number of times of collation in succession. If this condition is satisfied, the collation output mx4$f$ is changed to logic "1", and the resultant value is output. If the condition is not satisfied, logic "0" is output.

FIG. 11B shows an example wherein the number of times of collation is four. Alternatively, the number of times of collation may be set at another value.

In FIG. 11C, it is determined whether the following condition is satisfied: the value of superimposed signal mx4 takes logic "0" by a predetermined number of times of collation in succession. If this condition is satisfied, the collation output mx4$f$ is changed to logic "0", and the resultant value is output. If the condition is not satisfied, logic "1" is output.

FIG. 11C shows an example wherein the number of times of collation is four. Alternatively, the number of times of collation may be set at another value.

The code separation circuit 27 discriminates the discrimination code superimposed on the time data sd4, from the collation output of the superimposed signal. If the discrimination code is discriminated, the code separation circuit 27 generates the time data signal sd4 and reference timing t' and delivers them to the time calculation unit 23. If the discrimination code is not discriminated, only the time data signal sd4 is delivered to the time calculation unit 23.

An example of the superimposed time data signal is data relating to the time, i.e. year/month/day/hour/ minute/second, corresponding to the time of the reference timing. This data may be superimposed as a bit string of a predetermined baud transmission rate.

The operation of the digital protection relay with a time sync function having the above-described structure will now be described.

Figure 12:
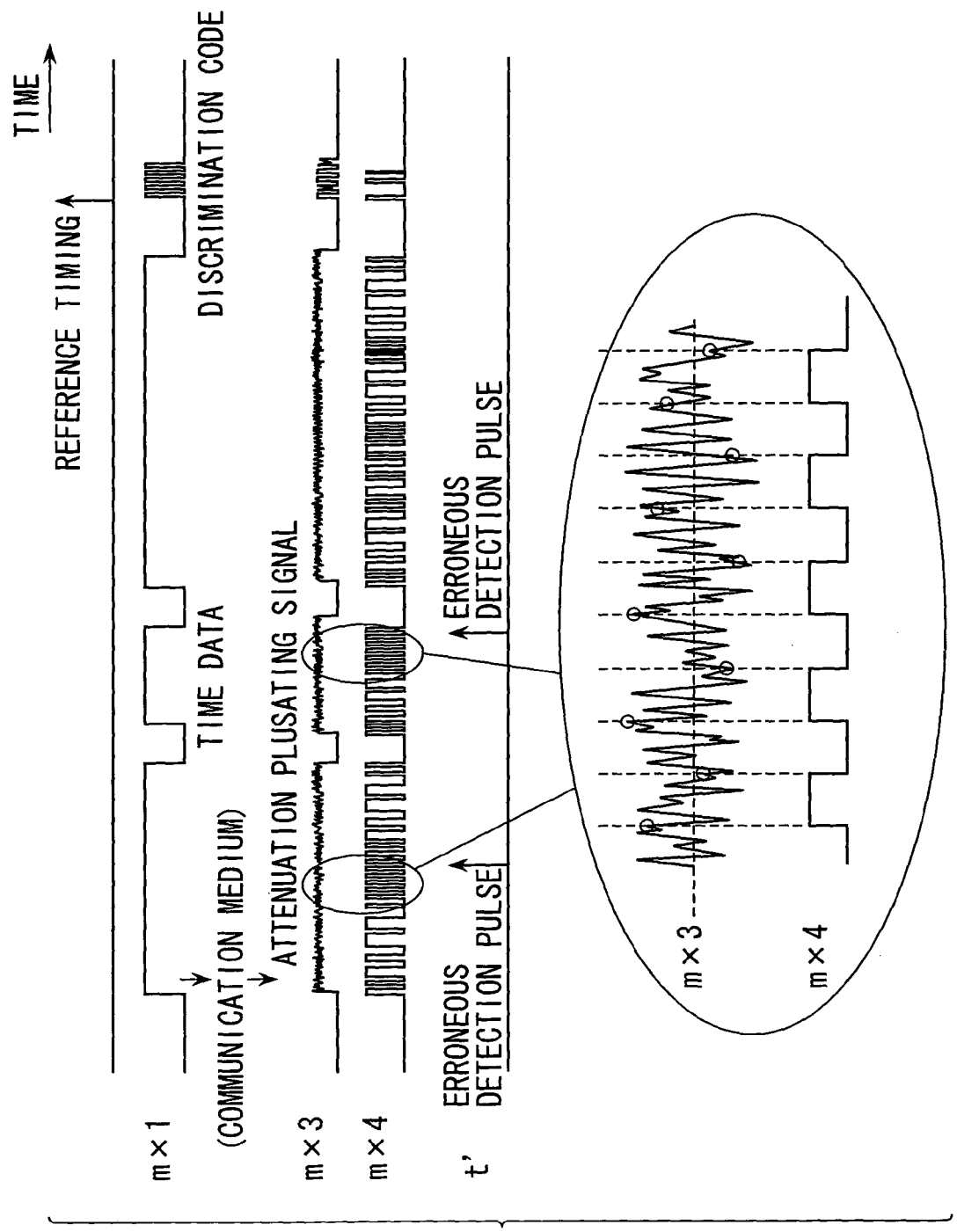
FIG. 12 is a time chart showing output states of respective parts at a time when a superimposed signal deteriorates due to noise, in a case where the collation circuit of the second embodiment is not used.

FIG. 12 is a time chart showing output states of respective parts in a case where the collation circuit is not used.

Assume that in the structure of FIG. 10 the collation circuit 26 is not provided and the digital output mx4 of the reception circuit 21 is directly input to the code separation circuit 27. In this case, when the waveform of the time data component in the reception signal mx3 of the superimposed signal has attenuated to a vicinity of the threshold of the signal high/low determination level, as shown in FIG. 12, the digital output mx4 from the reception circuit 21 irregularly changes between high and low levels in succession. As a result, it is possible that the digital output, as indicated by circular marks, happens to coincide with the discrimination codes, and the code separation circuit 27 may erroneously be discriminated as discrimination codes.

Figure 13:
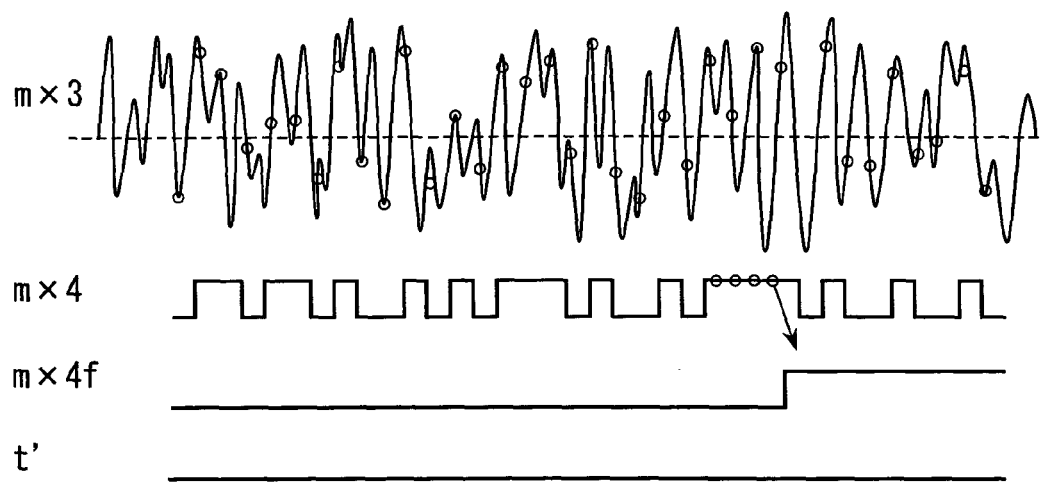
FIG. 13 is a time chart showing output states of respective parts at a time when a superimposed signal deteriorates due to noise, in a case where the collation circuit of the second embodiment is used.

FIG. 13 is a time chart indicating output states of respective parts in the case where the collation circuit is used.

In an example of the operation of the collation circuit 26, the value of the reception signal mx4 of the input superimposed signal is collated at predetermined collation cycles. If the reception signal mx4 takes the same value twice or more in succession, the collation output mx4$f$ is changed to this value. Otherwise, the previously output value is successively output.

In FIG. 13, when the waveform of the time data component in the reception signal mx3 of the superimposed signal has attenuated to a vicinity of the threshold of the signal high/low determination level, the waveform of the digital output mx4 from the reception circuit 21 irregularly changes between high and low levels in succession. However, the input value to the collation circuit 26 rarely takes the same value by a plurality of number of times in succession, and as a result the collation circuit 26 outputs, in most cases, the same value in succession. Accordingly, there is little possibility that the output of the collation circuit 26 becomes equal to the discrimination code.

There is a case where the cycle of irregular change is longer than the confirmation cycle of the collation circuit 26, and the input value to the collation circuit may coincide with the value of the superimposed signal from the current time point to a time point preceding by a plurality of cycles. In such a case, if the number of times of confirmation in the collation circuit 26 is increased, the possibility that the output of the collation circuit coincides completely with the discrimination code can be decreased.

Figure 14:
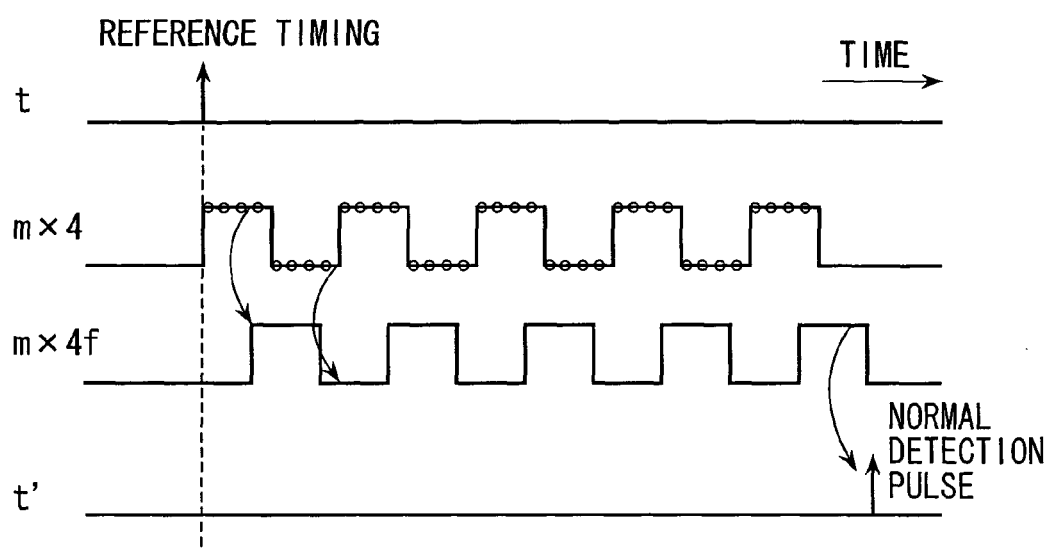
FIG. 14 is a time chart showing output states of respective parts in a case where the collation circuit in this embodiment receives a discrimination code.

FIG. 14 is a time chart indicating output states of respective parts in the case where the discrimination code is input to the collation circuit 26. FIG. 14 shows, by way of example, a case where the discrimination code included in the superimposed output at the time of the reference timing is collated by the collation circuit in which the number of times of collation is four.

As is understood from this time chart, a delay occurs in the discrimination code that is output as a result of the collation. In this case, the waveform itself of the code does not change, and the code discrimination circuit 27 can recognize the code.

There is an advantageous effect if the number of times of confirmation of digital data, by which the code discrimination circuit discriminates the code, is increased, without the use of the collation circuit.

As has been described above, according to the present embodiment, the reference timing and time data can be transmitted through the same communication medium. In addition, even if signal deterioration occurs in the process in which the reference timing and time data are transmitted from the transmission circuit and the reception circuit receives them via the communication medium, the time sync means does not erroneously recognize the reference timing.

Figure 15:
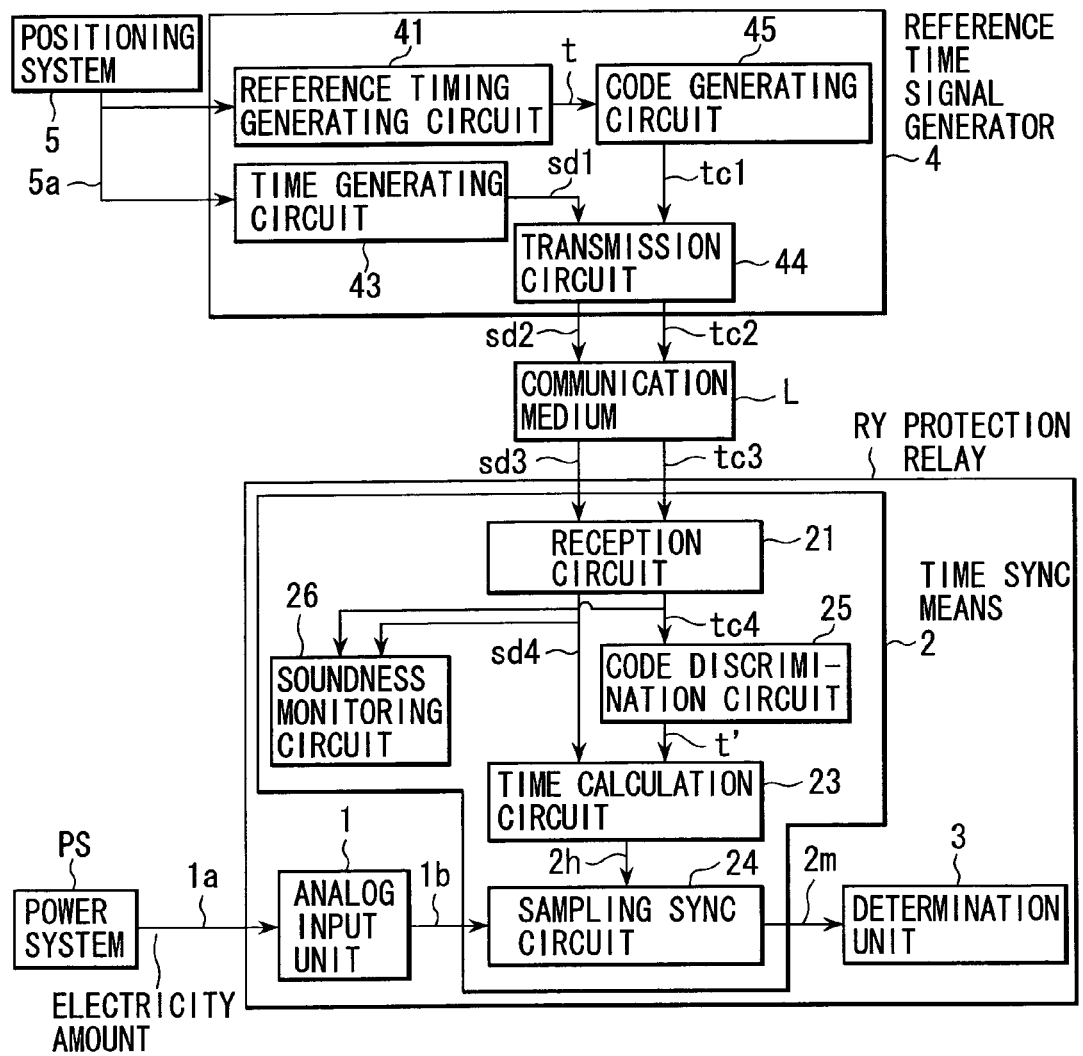
FIG. 15 is a block circuit diagram showing a third embodiment of a digital protection relay with a time sync function according to the present invention.

FIG. 15 is a block circuit diagram showing a third embodiment of a protection relay with a time sync function according to the present invention. The parts common to those in FIG. 3 are denoted by like reference numerals, and a description thereof is omitted. The third embodiment differs from the structure shown in FIG. 3 in that the time sync means 2 includes a soundness monitoring circuit 26.

The third embodiment is configured such that the time sync means 2 shown in FIG. 3 includes a soundness monitoring circuit 26 for monitoring the soundness of at least one of the transmission circuit 44 of time signal generator 4, the communication medium L and the reception circuit 21, on the basis of the state of at least one of the time signal sd4 and discrimination code tc4, which are digital values output from the reception circuit 21.

To monitor the soundness, in this context, means to detect the presence/absence of degradation in the transmission circuit, communication medium or reception circuit, as is described later.

Figure 16:
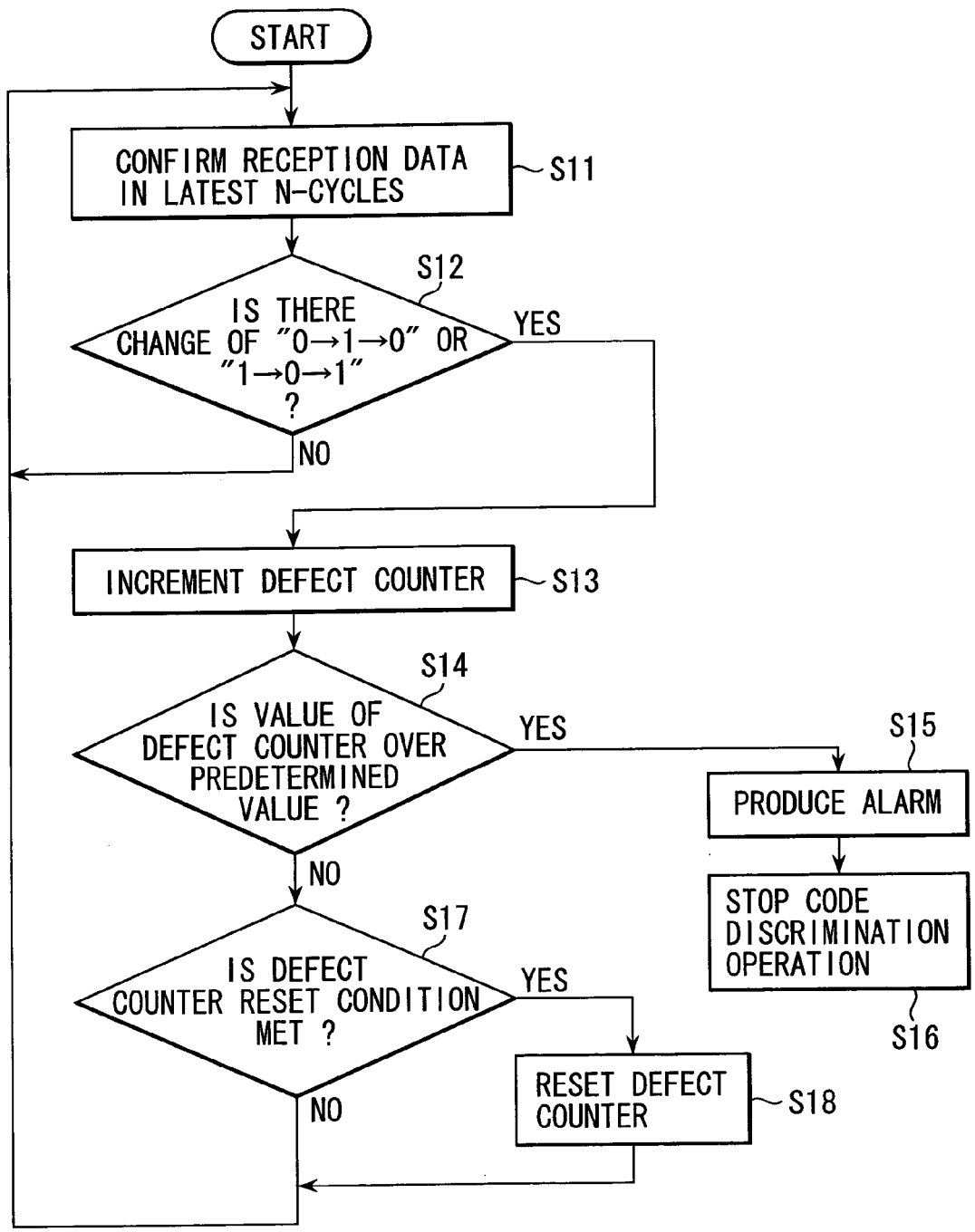
FIG. 16 is a flow chart illustrating an operation of the third embodiment of the digital protection relay with a time sync function according to the present invention.

The operation of the soundness monitoring circuit 26 is described referring to a flow chart of FIG. 16. This flow chart is applicable to both the time signal sd4 and discrimination code tc4, which are digital values. In this description, these signal and code are generally referred to as digital values.

In step S11, digital values output from the reception circuit 21 from the current time point to a time point preceding by an N-number of times of cycles are confirmed. In step S12, it is determined whether a change "0→1→0" or "1→0→1" occurs in the digital values from the current time point to a time point preceding by an N-number of times of cycles. If there is such a change, the control advances to processing in step S13. Otherwise, the control returns to step S11.

In step S13, the value of a defect counter is incremented, and the control goes to step S14. In step S14, it is determined whether the value of the defect counter exceeds a predetermined value. If the value does not exceed the predetermined value, the control goes to step S17.

In step S17, it is determined whether a defect counter reset condition is met. If the condition is met, the defect counter is reset in step S18. Otherwise, the control returns to step S11.

If at least one of the transmission circuit 44, communication medium L and reception circuit 21 deteriorates, an irregular variation would continuously occur in the digital value of the reception circuit 21. Consequently, the condition in step S12 is continuously met and the value of the defect counter is incremented in step S13.

In step S14, if it is determined that the value of the defect counter exceeds the predetermined value, an alarm is produced in step S15 and the code discrimination process is stopped in step S16.

With the provision of the communication state monitor means, deterioration of the transmission circuit, communication medium or reception circuit can be detected, and erroneous timing recognition due to long-time reception of the degraded signal can be prevented.

When the soundness of the time signal side is to be monitored, the time signal sd4 is input to the communication state signal input means. Thereby, deterioration of the time signal side in the transmission circuit, communication medium or reception circuit can be detected through the above-described determination process.

When the soundness of the discrimination code side is to be monitored, the discrimination code tc4 is input to the communication state signal input means. Thereby, deterioration in the transmission circuit, communication medium or reception circuit can be detected through the above-described determination process.

When the soundness of both the time signal side and the discrimination code side is to be monitored, both the time signal sd4 and the discrimination code tc4 are input to the communication state signal input means. Thereby, deterioration in the transmission circuit, communication medium or reception circuit can be detected through the above-described determination process.

In the above-described first embodiment, the collation circuit is not provided. However, the collation circuit that performs the operation described in the second embodiment may be inserted between the reception circuit 21, on the one hand, and the code discrimination circuit 25 and time calculation section 23, on the other. With the insertion of the collation circuit, code recognition with higher precision can be performed.

In the above-described embodiments, the sampling timing is determined using the time data sent from the time generating circuit. However, the time data is not indispensable. The time sync means 2 (time calculation unit 23) may determine the sampling timing on the basis of only the code information sent from the time signal generator 4.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

This application is based upon and claims the benefit of priority from the prior Japanese Patent Application No. 2002-284318, filed Sep. 27, 2002, the entire contents of which are incorporated herein by reference.

What is claimed is:

1. A digital protection relay with a time sync function, comprising:

analog input means for converting an analog quantity of electricity to a digital quantity of electricity by sampling the analog quantity of electricity input from a power system at predetermined cycles;

time sync means for receiving via a communication medium a discrimination code to be used for whether the discrimination code coincides with a predetermined code, that is generated on the basis of a reference timing generated based on a reception signal from a positioning system, and specifying a sampling timing of the digital quantity of electricity when the received discrimination code coincides with the predetermined code; and determination means for comparing the quantity of electricity, the sampling timing of which is specified, with a determination value, thereby discriminating the presence/absence of occurrence of a fault in the power system.

2. The digital protection relay with a time sync function, according to claim 1, wherein the time sync means receives time data from a time signal generator, and specifies the sampling timing of the digital amount on the basis of the discrimination code and the received time data.

3. The digital protection relay with a time sync function, according to claim 2, wherein the time sync means comprises:

a reception circuit that receives the discrimination code and the time data transmitted from the time signal generator via the communication medium;

a code discrimination circuit that discriminates the reference timing on condition that the discrimination code received by the reception circuit coincides with the predetermined code;

a time calculation circuit that calculates the sampling timing on the basis of the reference timing discriminated by the code discrimination circuit and the time data; and a sampling sync circuit that specifies the sampling timing of the digital quantity of electricity on the basis of the sampling timing calculated by the time calculation circuit.

4. The digital protection relay with a time sync function, according to claim 2, wherein the time sync means further comprises communication monitor means for monitoring the soundness of at least one of the transmission circuit of the time signal generator, the communication medium and reception circuit on the basis of the received time data and discrimination code.

5. A digital protection relay with a time sync function, comprising:

analog input means for converting an analog quantity of electricity to a digital quantity of electricity by sampling the analog quantity of electricity input from a power system at predetermined cycles; and time sync means for receiving via a communication medium a discrimination code that is generated on the basis of a reference timing generated based on a reception signal from a positioning system, and specifying a sampling timing of the digital quantity of electricity on the basis of the received discrimination code; and determination means for comparing the quantity of electricity, the sampling timing of which is specified, with a determination value, thereby discriminating the presence/absence of occurrence of a fault in the power system, wherein the time sync means receives time data from a time signal generator and specifies the sampling timing of the digital amount based on the discrimination code and the received time data, wherein the time data is superimposed as a signal on the discrimination code, and wherein the time sync means comprises:

a reception circuit that receives the superimposed signal;

a collation circuit that collates a logic value of the superimposed signal received by the reception circuit at a cycle shorter than a pulse cycle of the discrimination code to confirm whether a predetermined collation condition is met or not, and outputs a collation output under a predetermined output condition, on condition that the predetermined collation condition is met by a predetermined number of times in succession;

a code separation circuit that separates time data and a discrimination code from the collation output input from the collation circuit, and generates the reference timing when the separated discrimination code coincides with a predetermined discrimination code;

a time calculation circuit that calculates the sampling timing on the basis of the reference timing and time data output from the code separation circuit; and a sampling sync circuit that specifies the sampling timing of the digital quantity of electricity on the basis of the sampling timing calculated by the time calculation circuit.

6. A method of determining a fault in a digital protection relay with a time sync function, the method comprising:

converting an analog quantity of electricity to a digital quantity of electricity by sampling the analog quantity of electricity input from a power system at predetermined cycles;

receiving via a communication medium a discrimination code to be used for whether the discrimination code coincides with a predetermined code, that is generated on the basis of a reference timing generated based on a reception signal from a positioning system, and specifying a sampling timing of the digital quantity of electricity when the received discrimination code coincides with the predetermined code; and comparing the quantity of electricity, the sampling timing of which is specified, with a determination value, thereby discriminating the presence/absence of occurrence of a fault in the power system.

7. The method of determining a fault according to claim 6, wherein the specifying of the sampling timing includes receiving time data from a time signal generator and specifying the sampling timing of the digital amount on the basis of the discrimination code and the received time data.

8. The method of determining a fault according to claim 7, wherein the specifying of the sampling timing includes:

receiving the discrimination code and the time data transmitted from the time signal generator via the communication medium;

discriminating the reference timing on condition that the received discrimination code coincides with the predetermined code;

calculating the sampling timing on the basis of the discriminated reference timing and the time data; and specifying the sampling timing of the digital quantity of electricity on the basis of the calculated sampling timing.

9. The method of determining a fault according to claim 7, further comprising monitoring the soundness of the communication medium on the basis of the received time data and discrimination code.

10. A method of determining a fault in a digital protection relay with a time sync function, the method comprising:

converting an analog quantity of electricity to a digital quantity of electricity by sampling the analog quantity of electricity input from a power system at predetermined cycles;

receiving via a communication medium a discrimination code that is generated on the basis of a reference timing generated based on a reception signal from a positioning system, and specifying a sampling timing of the digital quantity of electricity on the basis of the received discrimination code; and comparing the quantity of electricity, the sampling timing of which is specified, with a determination value, thereby discriminating the presence/absence of occurrence of a fault in the power system, wherein the specifying of the sampling timing includes receiving time data from a time signal generator and specifying the sampling timing of the digital amount on the basis of the discrimination code and the received time data, wherein the time data is superimposed as a superimposed signal on the discrimination code, and wherein the specifying of the sampling timing comprises:

receiving the superimposed signal;

collating a logic value of the received superimposed signal at a cycle shorter than a pulse cycle of the discrimination code to confirm whether a predetermined collation condition is met or not, and outputting a collation output under a predetermined output condition, on condition that the predetermined collation condition is met by a predetermined number of times in succession;

separating time data and a discrimination code from the collation output, and generating the reference timing when the separated discrimination code coincides with a predetermined discrimination code;

calculating the sampling timing on the basis of the generated reference timing and time data; and specifying the sampling timing of the digital quantity of electricity on the basis of the calculated sampling timing.

* * * * *